United States Patent [19]

Pivirotto

[11] 4,347,613
[45] Aug. 31, 1982

[54] METHOD AND APPARATUS FOR CONVECTION CONTROL OF METALLIC HALIDE VAPOR DENSITY IN A METALLIC HALIDE LASER

[76] Inventor: Robert A. Frosch, Administrator of the National Aeronautics and Space Administration, with respect to an invention of Thomas J. Pivirotto, La Canada, Calif.

[21] Appl. No.: 130,496

[22] Filed: Mar. 14, 1980

[51] Int. Cl.³ .............................. H01S 3/02; H01S 3/22
[52] U.S. Cl. ........................................ 372/56; 372/59; 372/60
[58] Field of Search ............... 331/94.5 G, 94.5 D, 331/94.5 S; 372/56, 58, 59, 60

[56] References Cited

U.S. PATENT DOCUMENTS

| | | | |
|---|---|---|---|
| 3,789,320 | 1/1974 | Hepburn | 331/94.5 G |
| 4,068,196 | 1/1978 | Hohla et al. | 331/94.5 G |
| 4,129,835 | 12/1978 | Daiber et al. | 331/94.5 G |
| 4,224,579 | 9/1980 | Maslett et al. | 331/94.5 G |

OTHER PUBLICATIONS

Pivirotto, "Potentially high–energy copper halide laser", *Conference on Laser And Electrooptical Systems*, OSA/IEEE, Feb. 7–9, 1978, San Diego, Calif., Digest of Technical Papers, pp. 74–75.

Nerheim, "A Multiple Wavelength Mixed Metal Halide Laser", *Proceedings of the International Conference on Lasers '79*, Orlando, Fla., Dec. 17–21, 1979, pp. 323–326.

*Primary Examiner*—James W. Davie
*Attorney, Agent, or Firm*—Paul F. McCaul; John R. Manning

[57] ABSTRACT

A method and apparatus for convection control of metallic halide vapor density in a metallic halide laser (10). More particularly, an apparatus is disclosed wherein a reservoir (48) containing copper chloride (62), which in the exemplary embodiment is the metallic halide chosen, is heated so that the copper chloride is maintained in a liquid form. The apparatus includes a means for flowing a buffer gas, which in the exemplary embodiment is neon, over the liquid copper chloride to provide a mixture of copper chloride vapor and neon (72') above the liquid copper chloride. A conduit (50) for providing fluid communication between the reservoir (68) containing the copper chloride vapor/neon mixture and the laser (10) is also included. The copper chloride vapor density in the laser is related to the liquid copper chloride temperature and the neon flow rate through the reservoir (68). In accordance with a further feature of the exemplary embodiment, neon is also provided directly to the laser in order to provide a further means of controlling the copper chloride vapor density in the laser.

16 Claims, 5 Drawing Figures

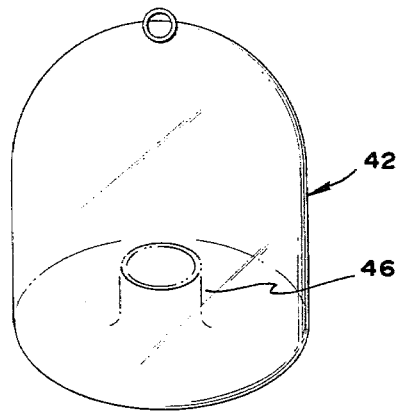
FIG. 4
FIG. 5
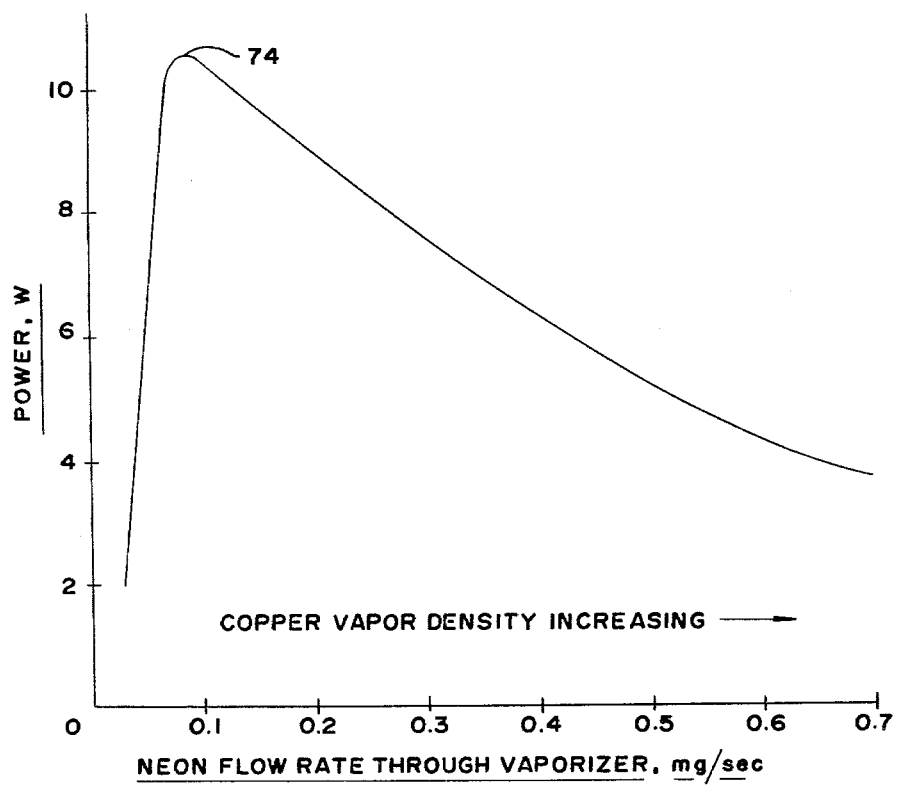

METHOD AND APPARATUS FOR CONVECTION CONTROL OF METALLIC HALIDE VAPOR DENSITY IN A METALLIC HALIDE LASER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 USC 2457).

TECHNICAL FIELD

The invention relates to metallic halide lasers and more particularly to a means for controlling the density of metallic halide vapor in a metallic halide laser.

BACKGROUND ART

A typical problem in a metallic halide laser is the control of the metallic halide vapor density within the laser. As is well known to those familiar with metallic halide lasers, the energy and peak power per discharge pulse is strongly dependent upon the metallic halide vapor density within the laser. Maximum power output can be obtained only over a very narrow range of vapor densities. One conventional way of controlling the vapor density is by a slow thermal diffusion of vapors from a metallic halide source located in either the laser discharge tube itself or in a separately heated reservoir. This method is critically dependent on the temperature of the metallic halide which can vary significantly.

A typical metallic halide laser, such as a copper halide laser, utilizes a continuous flow of a buffer gas such as neon through the laser tube. As a result, the copper halide vapor must be continuously supplied in order to maintain an optimum vapor density in the laser discharge. In one conventional system, a copper halide salt is placed along the bottom of the laser tube and the tube placed inside an oven having a uniform temperature. At very low pulse repetition rates, the temperature of the copper halide, and thus its vapor pressure, can be adjusted by changing the oven temperature. However, at higher pulse repetition rates it has been found that the copper halide vapor pressure and rate of vaporization are most dependent on the pulse discharge and can not be independently controlled. The present invention solves the above problems by providing a method and apparatus for continuously controlling the metallic halide vapor density in the laser tube regardless of temperature changes in the metallic halide vapor source.

STATEMENT OF INVENTION

The invention provides an apparatus for convection control of a metallic halide vapor density in a metallic halide laser which includes a reservoir means for containing a metallic halide in liquid and vapor forms, the reservoir means having an entrance port and an exit port; heating means for controlling the temperature of the liquid metallic halide vapor contained in the reservoir means, thereby producing a metallic halide vapor density related to the liquid metallic halide temperature; first means for flowing a buffer gas into the reservoir means entrance port, thereby providing a metallic halide vapor/buffer gas mixture having a metallic halide vapor density related to the temperature of the liquid metallic halide in the reservoir means and the rate of the flow of the buffer gas; and conduit means in fluid communication with the reservoir means and the laser for providing the metallic halide vapor/buffer gas mixture to the laser.

The method provided by the invention includes the steps of heating a metallic halide to a predetermined temperature, thereby producing a metallic halide vapor having a predetermined density; flowing a buffer gas through a volume containing the metallic halide vapor at a flow rate to provide a first predetermined metallic halide vapor/buffer gas mixture; and providing the metallic halide vapor/buffer gas mixture to the metallic halide laser.

In an exemplary embodiment of the invention copper chloride is chosen as the metallic halide and neon as the buffer gas. A reservoir is provided having a bottom portion containing liquid copper chloride at a predetermined temperature. A neon source is in fluid communication with the reservoir through a controllable valve for regulating the neon flow rate. A conduit in fluid communication with the reservoir and the laser provides the copper chloride vapor/neon mixture to the laser. Thus, the density of copper chloride vapor entering the laser can be readily controlled merely by altering the neon flow rate by the controllable valve. In accordance with another significant feature of the invention, a means for supplying neon directly to the laser is provided, thus further altering the copper chloride vapor density within the laser.

BRIEF DESCRIPTION OF DRAWINGS

FIG. 4 is a perspective view of the reservoir shown in FIG. 2; and

FIG. 5 is a graph showing output power of a metallic halide laser as a function of neon flow rate through a control apparatus provided by the invention.

BEST MODE FOR CARRYING OUT THE INVENTION

A detailed illustrative embodiment of the invention disclosed herein exemplifies the invention and is currently considered to be the best embodiment for such purposes. It is provided by way of illustration and not limitation of the invention. Various modifications thereof will occur to those skilled in the art, and such modifications are within the scope of the claims which define the present invention.

As previously explained, an apparatus for the control of a metallic halide vapor density within a metallic halide laser is disclosed. The apparatus includes a reservoir for containing the metallic halide in a liquid form, and a means for maintaining the liquid metallic halide at a predetermined temperature. A buffer gas is flowed through a volume above the liquid metallic halide which contains metallic halide vapor having a density related to the temperature of the liquid metallic halide. The metallic halide vapor/buffer gas mixture is entered into the metallic halide laser through a first entrance port. In accordance with a further feature of the disclosed apparatus, a buffer gas is flowed directly into the laser through a second entrance port located near the first entrance port, thereby providing a rapid means for varying the metallic halide vapor density within the laser. The metallic halide and buffer gas mixture is removed from the laser through an exit port. Thus, the flow of the metallic halide through the laser, and the density of the metallic halide vapor within the laser, is controlled by the flow rate of buffer gas directly into the laser. This provides an extremely rapid and efficient means for controlling vapor density within the laser.

Figure 1:
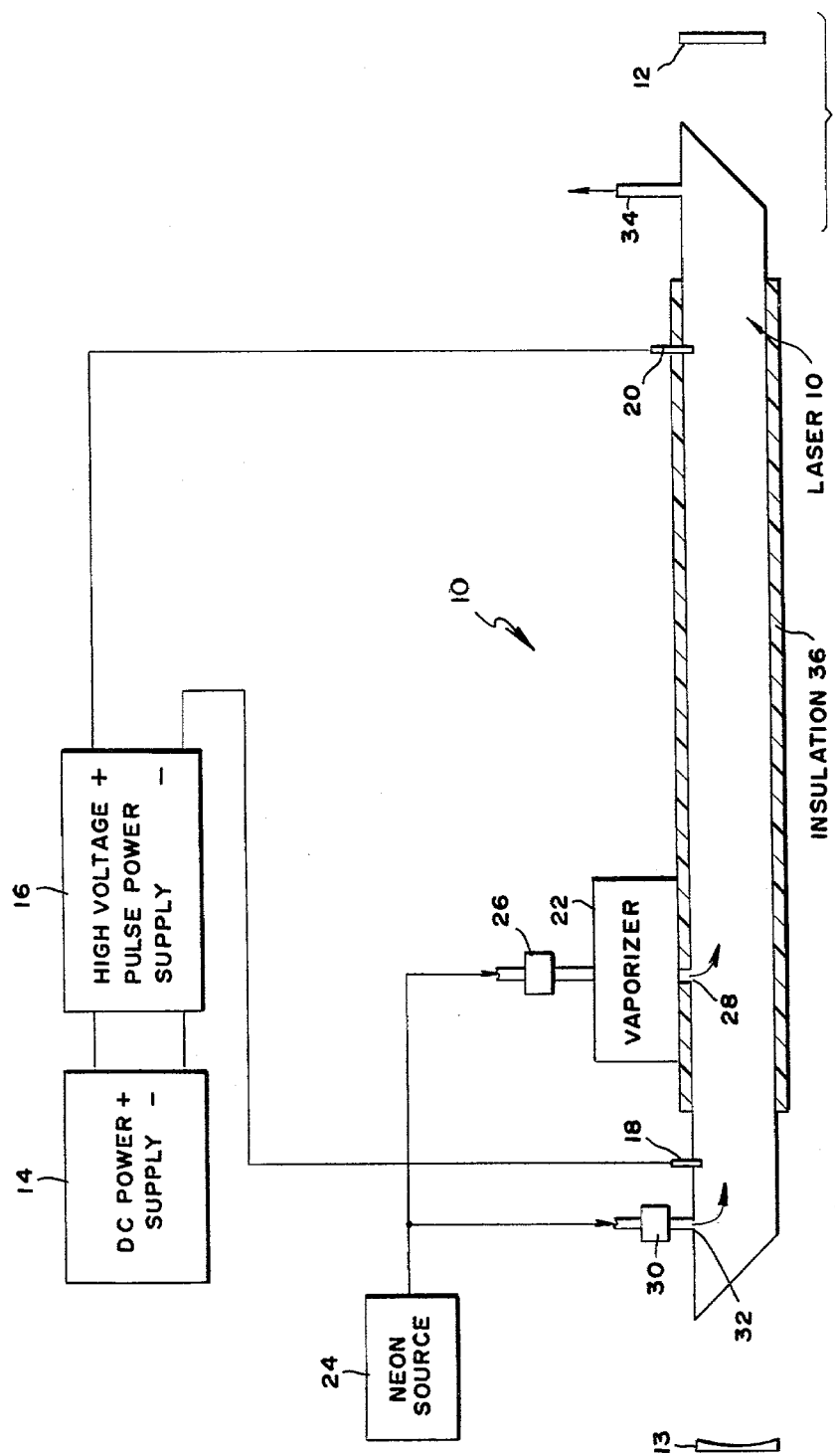
FIG. 1 is a block diagram of a metallic halide laser utilizing a metallic halide vapor density control apparatus provided by the invention.

Referring now to FIG. 1, a copper chloride laser 10 is provided, the laser 10 having first and second reflective surfaces, 12 and 13, respectfully, typically utilized with pulsed lasers. A DC power supply 14 charges a capacitor (not shown) in a high voltage pulse power supply 16 to a predetermined value. The high voltage pulse power supply 16, at a predetermined repetition rate, impresses the charge on the capacitor across a cathode 18 and anode 20 in the laser, thereby causing the copper atoms within the laser 10 to be pumped by direct electron impact into resonant states from which stimulated emissions from the resonant states to two lower metastable states can occur. In the case of copper, the resulting emissions are at two visible wavelengths, 5106 Å and 5782 Å. Referring again to FIG. 1, a copper chloride vaporizer 22 to be explained in detail below is provided. Neon from a neon source 24 is provided to the vaporizer 22 via a first controllable valve 26. The vaporizer 22 is in fluid communication with the laser 10 via a first entrance port 28. In addition, neon from the neon source 24 is provided directly to the laser 10 through a second controllable valve 30 and a second entrance port 32. The laser also has an exhaust port 34 for discharge of the vaporized copper chloride and neon.

In operation, neon from the neon source 24 is provided to the vaporizer 22. The copper chloride vapor density within the vaporizer 22 is partially determined by the temperature of liquified copper chloride, to be explained below, within the vaporizer 22 and flow rate of neon thruogh the vaporizer 22 as controlled by the first valve 26. In order to more rapidly and precisely control the copper chloride vapor density within the laser 10, neon is provided directly into the laser 10 through the second valve 30 and the second entrance port 32. Temperature fluctuations in the liquid copper chloride within the vaporizer 22, and thus density fluctuations in the liquid copper chloride within the vaporizer 22, can be compensated for by adjustment of the two valves 26 and 30, thereby providing a means for rapidly altering the vapor density within the laser 10. Insulation 36 is provided around the outer surface of the laser 10.

Figure 2:
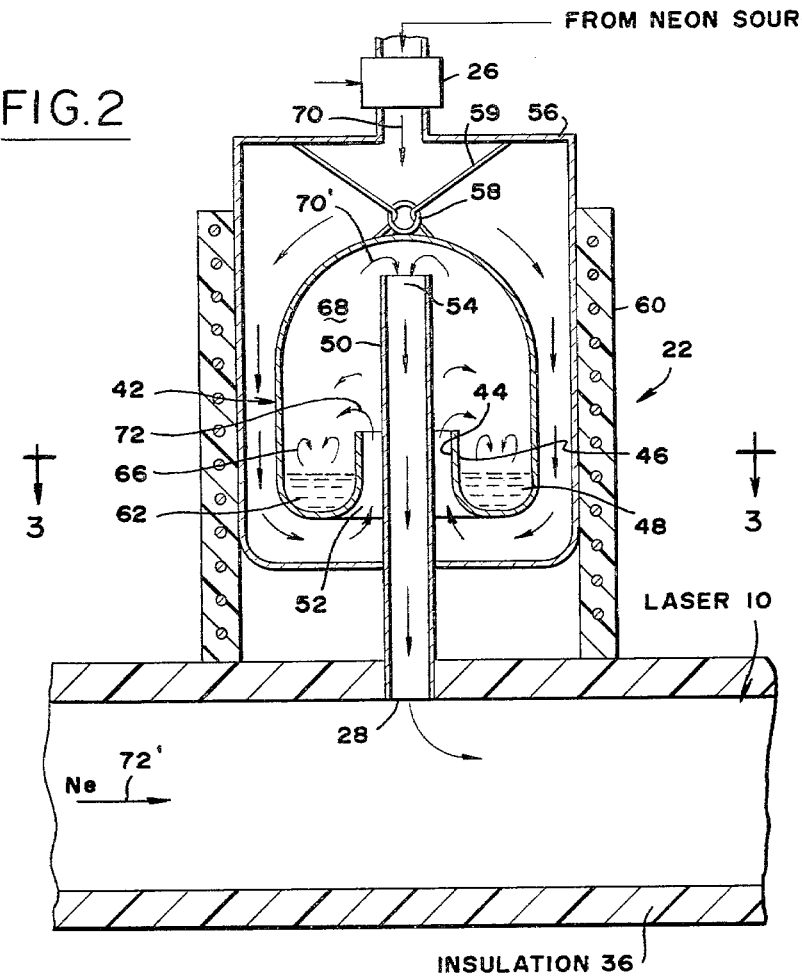
FIG. 2 is a cross-sectional view of the vaporizer shown in FIG. 1.
Figure 3:
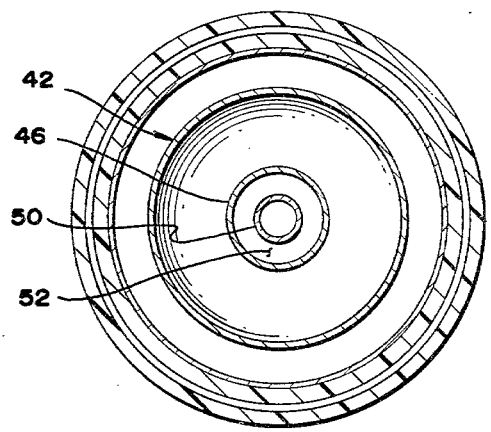
FIG. 3 is a cross-sectional view taken along line 3—3 of FIG. 2.

A cross-sectional view of the vaporizer 22 can be seen in FIG. 2. It includes a reservoir or enclosure 42 having an opening 44 formed in its bottom by an upwardly-extending side wall 46, which, in conjunction with the inner surface of the reservoir 42, defines a depression 48 for containing liquid copper chloride. Extending upwardly through the opening 44 is a stand pipe or conduit 50 having a diameter less than that of the opening 44 so as to provide an entry conduit or channel 52 through which neon can flow as will be explained below. The entry channel 52 provides an entrance port into and the upper opening 54 of the stand pipe 50 provides an exit port from the reservoir 42. The reservoir 42 is in fluid communication with the laser 10 via the stand pipe 50. A buffer gas conduit 56 is in fluid communication with the first valve 26 and the opening 44 so that neon flowing through the first valve 26 is directed to the entry channel 52. The reservoir 42 has an eyelet 58 formed at its top so that it can be suspended from an inner surface of the buffer gas conduit 56 by a suspension wire 59. A wire wound heater 60 is provided for maintaining the temperature of liquid copper chloride 62 contained within the depression 48 at a predetermined value. The reservoir 42 is suspended by the suspension wire 59 so that the upper opening 54 of the stand pipe 50 is spaced apart from an inner surface of the reservoir 42. In FIG. 3, a cross sectional view taken along line 3—3 of FIG. 2 shows the stand pipe 50, upwardly extending side wall 46 and reservoir 42. The entry channel 52 can be seen as being defined by the space between the stand pipe 50 and the upwardly extending side wall 46. A perspective view of the reservoir 42 can be seen in FIG. 4.

Operation of the vaporizer can best be understood in reference to FIG. 2. As the liquid copper chloride 62 is heated, copper chloride vapor as represented by the arrows 66 accumulates in the volume 68 defined by the reservoir 42. Neon 70 flows through the first valve 26 and downwardly about the outer surface of the reservoir 42 and is forced upwardly through the entry channel 52 as shown at 72. At this point the neon and copper chloride vapor mix and are forced outwardly from the volume 68 through the upper opening 54 of the stand pipe 50 as shown at 70'. This copper chloride/neon mixture 72 is provided to the laser 10. The ratio of copper chloride vapor to neon entering the laser 10 is related to the temperature of the liquid copper chloride 62 and of the flow rate of the neon 70. As previously explained, this ratio can be further altered by neon entering the laser through the second entrance port 32 as shown by the arrow at 72'. Thus, it can be appreciated that merely through control of neon flowing through the first valve 26 and the second valve 30, the density of copper chloride vapor within the laser 10 can be accurately maintained even though there are significant fluctuations in the temperature of the liquid copper chloride 62.

Referring now to FIG. 5, a graph showing output power of a copper chloride laser as a function of copper vapor density as determined by neon flow rate can be seen. As can be appreciated, maximum output power as shown at 74 is critically dependent upon the density of copper vapor within the laser.

Thus, it should now be apparent that a means for controlling the density of a metallic halide vapor in a metallic halide laser has been described wherein the metallic halide density can be accurately controlled by controlling the flow rate of a buffer gas through a vaporizer and also through an entrance port directly into the laser. Although the preferred embodiment has been described in terms of a copper chloride laser and neon as a buffer gas, it should be understood that any metallic halide material could be utilized. Examples of metallic halide materials which could be utilized include copper bromide, copper iodide, copper fluoride, iron chloride, iron bromide, iron iodide, iron fluoride, lead chloride, lead bromide, lead iodide, lead fluoride, manganese chloride, manganese bromide, manganese iodide and manganese fluoride. Although the exemplary embodiment was described in terms of liquid copper chloride in the depression 48 as the metallic halide material, it should be understood that some of the metallic halide materials could be in a solid phase state as they are heated in the reservoir 42. Also, any other noble gas could be used in lieu of neon.

What is claimed is:

1. In a metallic halide laser comprised of a tube having a first gas entry port, a gas exit port, and a second gas entry port in said tube on the side of said first gas entry port remote from said exit port, and an apparatus for the control of metallic halide vapor density within said laser between said second entry port and said exit port, the combination comprising:
   reservoir means for containing a metallic halide material in either a liquid or solid state form;
   heating means for varying the temperature of said metallic halide material to effect a predetermined metallic halide vapor density within said reservoir means;
   means for flowing a buffer gas into said reservoir means; and
   means for exhausting a mixture of said buffer gas and a portion of said metallic halide vapor from said reservoir means into said laser through said first entry port; and
   means for flowing buffer gas into said tube through said second gas entry port, thereby controlling the metallic halide vapor density within said laser.

2. The apparatus of claim 1 wherein said reservoir means comprises an enclosure having an opening formed in its bottom and a side wall extending upwardly into said enclosure around the periphery of said opening, said side wall and said enclosure forming a cavity for holding said metallic halide material.

3. The apparatus of claim 2 wherein said means for exhausting comprises a stand pipe in fluid communication with said laser, said stand pipe being adapted to be positioned within said enclosure opening and extending upwardly through said enclosure opening beyond said side wall, said stand pipe further being adapted so that said buffer gas can flow into said enclosure via an entry conduit formed by a portion of said standpipe outer surface and said side wall.

4. The apparatus of claim 3 wherein said means for flowing comprises means for controlling the flow rate of said buffer gas into said enclosure.

5. The apparatus of claim 4 wherein said means for flowing further comprises a buffer gas conduit means in fluid communication with a buffer gas reservoir and said entry conduit, and said means for controlling the flow rate comprises a controllable valve for controlling the flow rate of buffer gas through said buffer gas conduit.

6. The apparatus of claim 5 wherein said reservoir means is located within a volume formed by said buffer gas conduit means.

7. The apparatus of claim 6 wherein said heating means comprises electrical heating means located adjacent to the outer surface of said buffer gas conduit means.

8. The apparatus of claim 1 wherein said buffer gas is a noble gas.

9. The apparatus of claim 8 wherein said noble gas is neon.

10. The apparatus of claim 1 wherein said metallic halide is copper chloride.

11. The apparatus of claim 1 wherein said metallic halide is copper bromide.

12. An apparatus for convection control of a metallic halide vapor density in a metallic halide laser comprising:
   reservoir means for containing a metallic halide in either a liquid or solid form and a vapor form, said reservoir means being comprised of a sealed container having an opening in its bottom that is formed by a side wall extending upwardly into a volume defined by said sealed container;
   a conduit adapted to extend through said bottom opening of said sealed container in a nonsealing manner, the upper end of said conduit being in fluid communication with said volume defined by said sealed container and the lower end of said conduit passing into said laser;
   heating means for controlling the temperature of said liquid or solid metallic halide contained in said reservoir means, thereby producing a metallic halide vapor density related to said liquid or solid metallic halide temperature; and
   first means for flowing a buffer gas into said reservoir means, thereby causing a metallic halide vapor/buffer gas mixture to flow through said conduit into said laser, said gas mixture having a metallic halide vapor density related to the temperature of said liquid or solid metallic halide in said reservoir means and the rate of flow of said buffer gas.

13. The apparatus of claim 12 further comprising second means for flowing a buffer gas directly into said laser for mixing with said metallic halide vapor-buffer gas mixture from said conduit means, thereby altering said metallic halide vapor density in said laser.

14. The apparatus of claim 13 wherein said first means for flowing comprises a first means for controlling the flow rate of said buffer gas into said reservoir means and said second means for flowing comprises a second means for controlling the flow rate of said buffer gas directly into said laser.

15. The apparatus of claim 14 wherein said first means comprises a buffer gas conduit formed around said container and in fluid communication with said entrance port.

16. The apparatus of claim 15 wherein said heating means comprises electrical heating elements formed about said buffer gas conduit.

* * * * *